(12) United States Patent
Phunde et al.

(10) Patent No.: US 12,114,600 B2
(45) Date of Patent: Oct. 15, 2024

(54) COMPOSITE MOWER DECK

(71) Applicant: Deere & Company, Moline, IL (US)

(72) Inventors: Amol Phunde, Pune (IN); Sanjeev M. Hallale, Pune (IN)

(73) Assignee: Deere & Company, Moline, IL (US)

( * ) Notice: Subject to any disclaimer, the term of this patent is extended or adjusted under 35 U.S.C. 154(b) by 220 days.

(21) Appl. No.: 17/249,414

(22) Filed: Mar. 2, 2021

(65) Prior Publication Data
US 2022/0279716 A1 Sep. 8, 2022

(51) Int. Cl.
*A01D 34/81* (2006.01)
*A01D 101/00* (2006.01)

(52) U.S. Cl.
CPC .......... *A01D 34/81* (2013.01); *A01D 2101/00* (2013.01)

(58) Field of Classification Search
CPC ..... A01D 34/81; A01D 2101/00; A01D 75/30
See application file for complete search history.

(56) References Cited

U.S. PATENT DOCUMENTS

| | | | | |
|---|---|---|---|---|
| 2,518,093 | A * | 8/1950 | Sutter | A01D 34/6806 280/848 |
| 3,097,469 | A * | 7/1963 | Belfiore | A01D 34/73 56/295 |
| 3,890,773 | A * | 6/1975 | Frost | A01D 34/63 474/181 |
| 4,189,903 | A | 2/1980 | Jackson et al. | |
| 4,899,526 | A * | 2/1990 | Harris | A01D 34/81 56/320.2 |
| 5,136,829 | A * | 8/1992 | Sebben | A01D 34/74 D15/15 |
| 5,181,372 | A * | 1/1993 | Hayek | A01D 75/18 56/320.1 |
| 5,638,668 | A | 6/1997 | Kallevig et al. | |
| 5,884,466 | A | 3/1999 | Willmering et al. | |
| 6,336,312 | B1 * | 1/2002 | Bednar | A01D 34/74 56/13.6 |
| 7,024,847 | B2 | 4/2006 | Hartley | |
| 7,741,793 | B2 * | 6/2010 | Lucas | H02P 4/00 56/10.1 |
| 8,327,613 | B2 | 12/2012 | Johansson et al. | |
| 9,787,225 | B2 * | 10/2017 | Lucas | E01H 5/045 |
| 2003/0163981 | A1 * | 9/2003 | Osborne | A01D 34/81 56/320.1 |
| 2011/0277439 | A1 * | 11/2011 | Neudorf | A01D 34/005 56/320.1 |
| 2016/0183451 | A1 * | 6/2016 | Conrad | A01D 34/66 56/10.2 R |
| 2017/0245433 | A1 * | 8/2017 | Derra | A01D 34/005 |

FOREIGN PATENT DOCUMENTS

GB 2393891 A 4/2004

* cited by examiner

*Primary Examiner* — Thomas B Will
*Assistant Examiner* — Julia C Tran

(57) ABSTRACT

A composite mower deck includes a metal webbing sandwiched between an outer plastic shell and an inner plastic skin. The inner plastic skin has a substantially smooth undersurface for flow of grass clippings. The metal webbing may include an inner ring for supporting a motor hub.

15 Claims, 3 Drawing Sheets

COMPOSITE MOWER DECK

FIELD OF THE INVENTION

The present invention relates to grass mowing machines for golf courses and more specifically to a composite mower deck for mowing golf course roughs.

BACKGROUND OF THE INVENTION

Many new and existing golf courses have narrowed their fairways and expanded their rough areas on either side of the fairways. Roughs require less care than fairways, so narrowing the fairways allows golf course operators to lower their maintenance costs. For example, irrigation requirements may be reduced if only the fairways are watered. If grasses in the roughs are allowed to grow longer, those non-irrigated areas are less brown. Trees and other aesthetic features may be located in the roughs, because roots and shade can inhibit turf growth in the fairways.

However, golf course roughs still must be maintained regularly using grass mowing machines that can mow the vegetation at an acceptable length and appearance. Equipment for mowing golf course roughs typically includes a traction vehicle carrying three or more rotary cutting decks, each rotary cutting deck mounted on the end of a lift arm extending from the traction vehicle. Carrying the rotary cutting decks with lift arms extending from the front or sides of the traction vehicle is necessary and desirable, instead of towing the rotary cutting decks behind the vehicle, because it is necessary for the mower to provide close trims next to trees, bunkers or other hazards. Each lift arm also may be used to move a rotary cutting deck between a mowing position and a transport position. The mounting devices also should allow for pitch (front to back pivoting) and yaw (side-to-side pivoting) of the rotary cutting decks. Additionally, mounting devices should allow adjustment of the front to back angle of a rotary cutting deck for the desired rake or pitch.

Traction vehicles carrying several rotary cutting decks may travel at speeds of 6 to 8 miles per hour when mowing golf course roughs. The traction vehicle's weight may be in excess of 2000 pounds. Each rotary cutting deck may be subject to shocks from impacts against the ground surface or objects during mowing. To withstand the rigorous mowing conditions, rotary cutting decks typically are made of thick sheet steel, such as 7 gage or 10 gage sheet steel. Each rotary cutting deck may have a diameter between about 18 inches and 27 inches, weigh at least 120 pounds, and may have a cutting blade rotated by a hydraulic or electric motor.

To maximize productivity, it has been proposed to increase the number of rotary cutting decks carried by a traction vehicle. For example, a traction vehicle with 5 or 7 rotary cutting decks could be used for mowing golf course roughs. However, the extra weight of additional rotary cutting decks may increase fuel consumption and power requirements, or reduce vehicle speed and performance. Additionally, the extra weight of additional rotary cutting decks may increase demands on the hydraulic and/or electrical system that raises and lowers the decks when turning or transporting. A lighter rotary cutting deck is needed for mowing golf course roughs.

In the past, metal or plastic liners or baffles have been attached to rotary walk behind mower decks. For example, U.S. Pat. No. 5,638,668 for Lawn Mower Having Nested Deck and Liner shows a metallic liner stamped from relatively thin steel, fastened to an inexpensive, lightweight plastic material such as high density polyethylene. U.S. Pat. No. 5,884,466 for Plastic Deck Liner for Lawn Mower shows a wear-resistant polymer layer applied under the metal deck. Additionally, U.S. Pat. No. 4,189,903 for Rotary Lawn Mower with Removable Mulching Attachment, shows a plastic mulching liner mounted within a metal mower housing. Plastic liners or baffles may protect the bottom surfaces of walk behind mower decks, or direct the flow of grass clippings, but have not been used to reduce the weight of multiple decks for mowing golf course roughs.

SUMMARY OF THE INVENTION

A composite mower deck includes a one-piece outer plastic shell, a one-piece inner plastic skin positioned under the one-piece outer plastic shell, and a metal webbing positioned between the outer plastic shell and inner plastic skin. The composite mower deck of claim also includes a plurality of channels in the one-piece outer plastic shell where the metal webbing is recessed

DESCRIPTION OF THE PREFERRED EMBODIMENT

Figure 1:
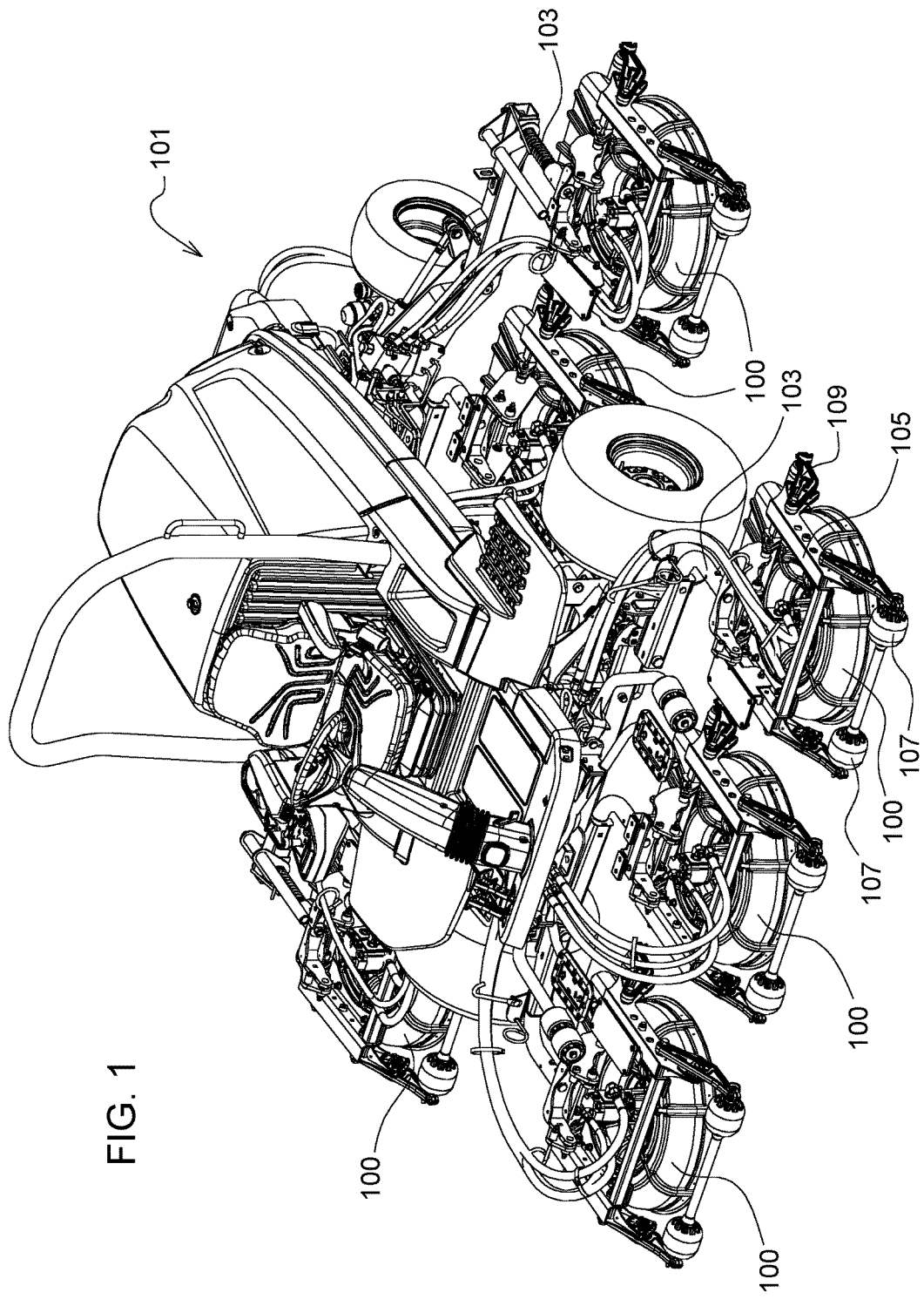
FIG. 1 is a perspective view of a traction vehicle supporting a plurality of composite mower decks according to a first embodiment of the invention.

As shown in FIG. 1, in a first embodiment, a plurality of composite mower decks 100 may be supported or carried by traction vehicle 101 for mowing golf course roughs. For example, in FIG. 1, seven composite mower decks are shown supported or carried by traction vehicle 101, with four of the decks positioned between the traction vehicle's front and rear wheels, and three decks position ahead of the front wheels. Each composite mower deck may be attached to the traction vehicle with a lift arm 103 that may extend outwardly from the traction vehicle and pivot for raising and lowering the composite mower deck. For example, the mower decks may be raised when turning around the traction vehicle or during transport, for example. Each lift arm may be attached to a support frame 105 on each composite mower deck. A pair of front wheels 107 and rear roller 109 also may be attached to the support frame for contacting the turf and preventing scalping especially when the composite mower deck is used for mowing uneven or sloping golf course roughs.

Figure 2:
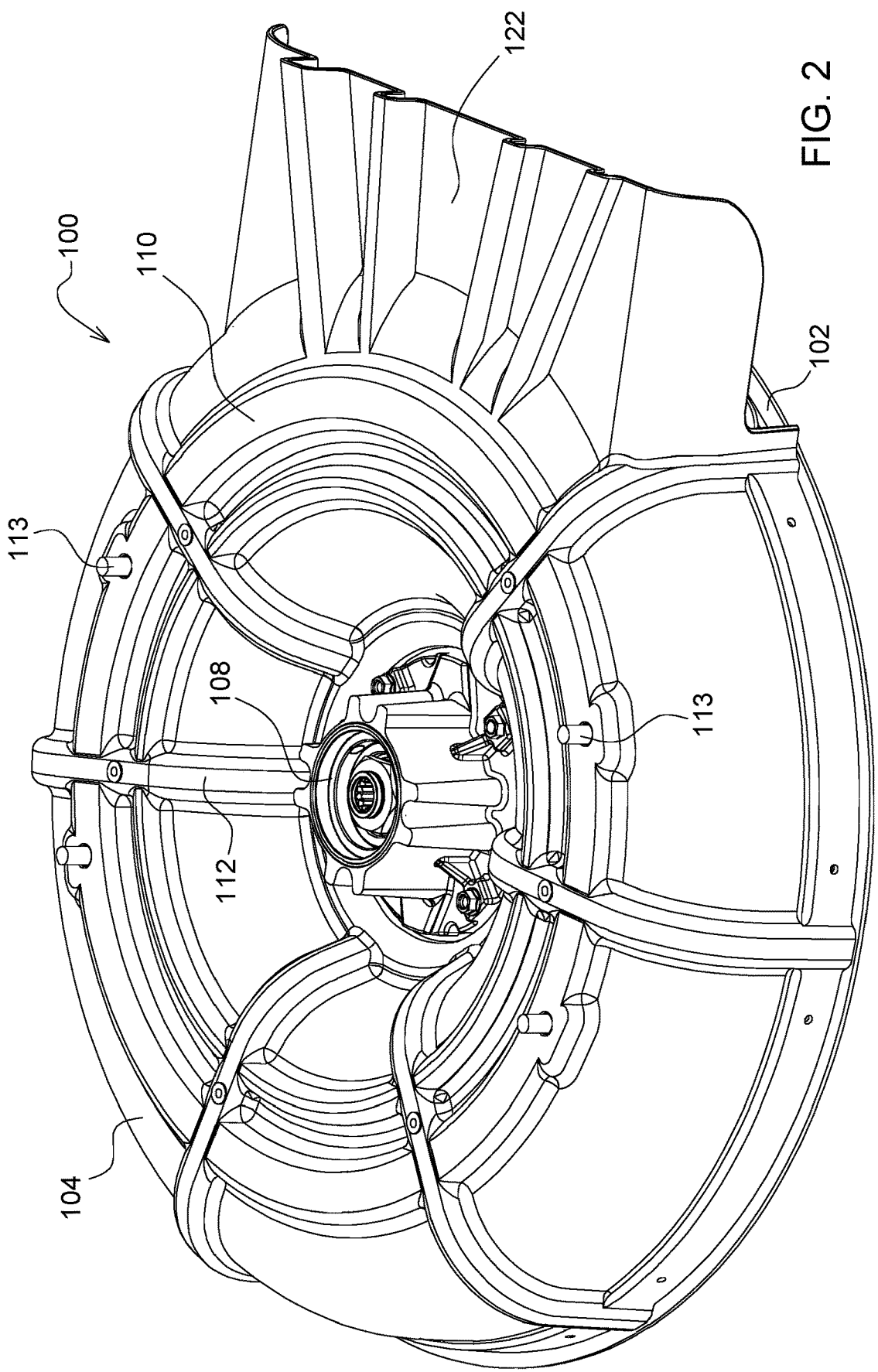
FIG. 2 is a perspective view of a composite mower deck according to a first embodiment of the invention.
Figure 3:
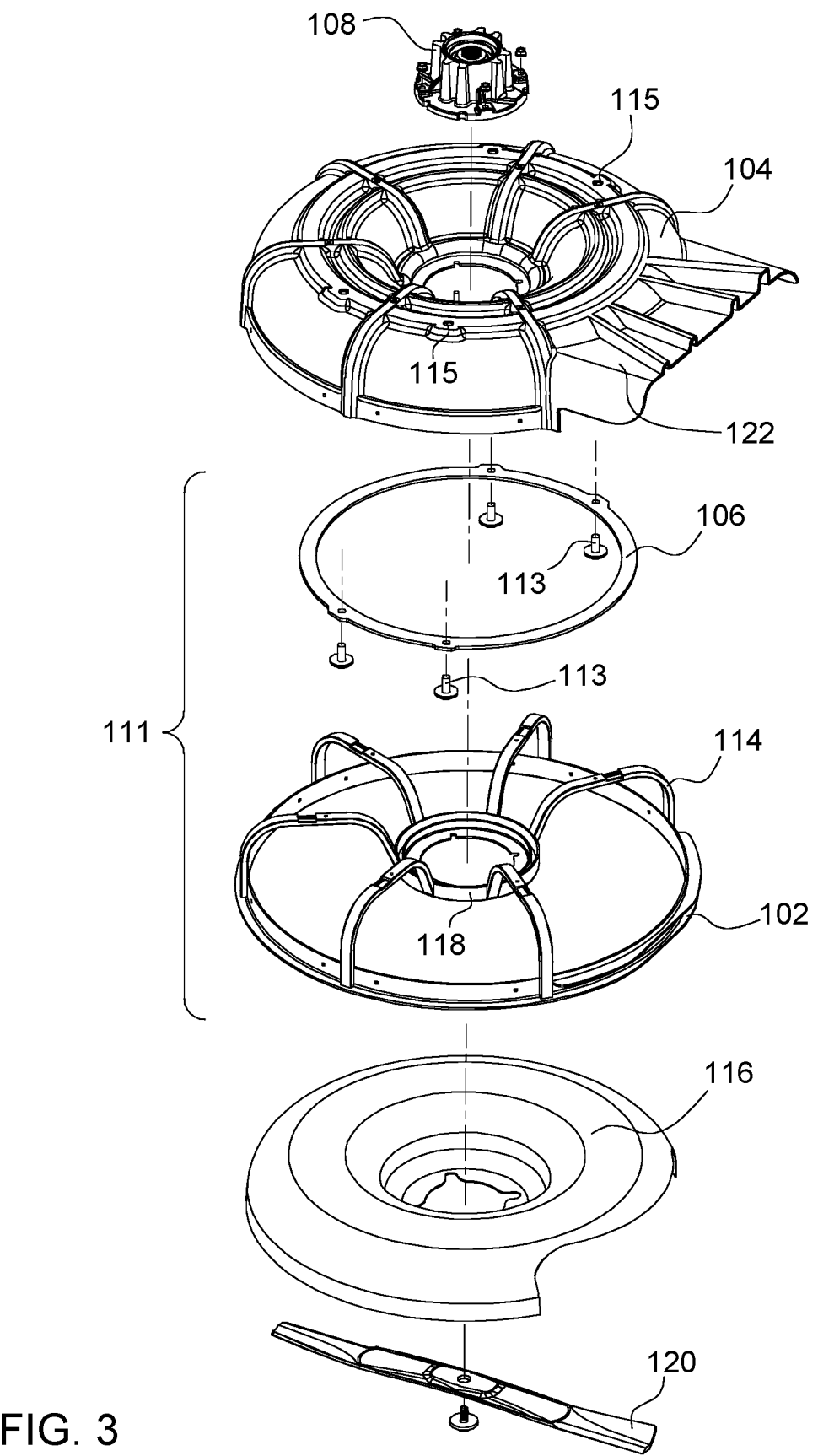
FIG. 3 is an exploded view of a composite mower deck according to a first embodiment of the invention.

In one embodiment, shown in FIGS. 2 and 3, each composite mower deck 100 may include a one-piece outer plastic shell 104, and a one-piece inner plastic skin 116 positioned under the one-piece outer plastic shell. For example, the inner plastic skin and outer plastic shell may be high density polyethylene, linear low density polyethylene, cross linked polyethylene, which also may be embedded with glass or carbon fiber. The inner plastic skin preferably may have a thickness of about 1.5 mm to about 3 mm, and the outer plastic shell preferably may have a thickness of about 3 mm to about 4 mm. The composite mower deck also may include metal webbing 111 sandwiched between the outer plastic shell and inner plastic skin. The metal webbing may be steel or other high strength material that reinforces and strengthens the composite mower deck. For example, the metal webbing may include outer ring 102, middle ring 106, and inner ring 118. A plurality of spaced ribs 114 may extend radially between the outer ring, middle ring and inner ring. The outer shell may include channels 110, 112 where the ribs and middle ring of the metal webbing may be positioned and recessed, so the metal webbing does not interrupt the flow of grass clippings around the substantially smooth undersurface of the inner plastic skin. The metal webbing may be attached to the channels in the outer shell by rivets or threaded fasteners 113 extending through openings 115. Alternatively, adhesives may be used between the outer shell and inner plastic skin. The outer ring of the metal webbing may be positioned at or near the perimeters of the outer plastic shell and the inner plastic skin. The inner ring may encircle central hub 108 or spindle where an electric or hydraulic motor may be positioned for rotating cutting blade 120. The composite mower deck also may include grass discharge opening 122 directed rearwardly between the ribs of the metal webbing.

Having described the preferred embodiment, it will become apparent that various modifications can be made without departing from the scope of the invention as defined in the accompanying claims.

What is claimed is:

1. A composite mower deck, comprising:
   a one-piece outer plastic shell,
   a one-piece inner plastic skin positioned under the one-piece outer plastic shell; and
   a metal webbing including a plurality of spaced metal ribs sandwiched in a plurality of spaced radial channels between the outer plastic shell and inner plastic skin.

2. The composite mower deck of claim 1 wherein the metal webbing includes a plurality of spaced rings connected by spaced ribs in the spaced radial channels between the rings.

3. The composite mower deck of claim 1 wherein the composite mower deck is connected to a lift arm extending outwardly from a traction vehicle.

4. A composite mower deck, comprising:
   a metal webbing sandwiched in a plurality of spaced radial channels and in a plurality of spaced encircling channels between an outer plastic shell and an inner plastic skin;
   the inner plastic skin having a substantially smooth undersurface for flow of grass clippings;
   the metal webbing having an inner ring for supporting a motor hub for rotating a cutting blade.

5. The composite mower deck of claim 4 wherein the metal webbing includes a plurality of radially extending ribs between the inner ring, a middle ring, and an outer ring, wherein the rings are spaced from each other and wherein the ribs are spaced from each other.

6. The composite mower deck of claim 5 wherein the outer ring is at a perimeter of the outer plastic shell and the inner plastic skin.

7. A composite mower deck, comprising:
   a metal webbing including an outer ring, middle ring and inner ring;
   a plurality of spaced ribs extending radially between and attached to the outer ring, middle ring and inner ring; and
   a plurality of radial and circumferential recesses where the spaced ribs are positioned over a smooth downwardly facing surface.

8. The composite mower deck of claim 1 wherein the plurality of radial channels are formed in the one-piece outer plastic shell and the metal webbing is recessed in the plurality of radial channels.

9. The composite mower deck of claim 1 wherein the metal webbing includes at least two separate rings spaced from each other and connected by at least three separate ribs spaced from each other in the spaced radial channels between the rings.

10. The composite mower deck of claim 9 wherein the one-piece outer plastic shell includes at least two spaced encircling channels recessed therein and each directly receiving one of the at least two separate rings of corresponding shape, and at least three spaced radial channels recessed therein and each directly receiving one of the at least three separate ribs of corresponding shape.

11. The composite mower deck of claim 1 wherein the metal webbing includes at least three separate rings spaced from each other and connected by at least three separate ribs spaced from each other in the spaced radial channels between the rings.

12. The composite mower deck of claim 4, wherein the radial and encircling channels are formed in the outer plastic shell, and the metal webbing is disposed and recessed in the radial and encircling channels of the outer plastic shell.

13. The composite mower deck of claim 12, wherein the metal webbing includes a plurality of separate spaced rings and a plurality of separate spaced ribs joining the rings, and wherein the radial and encircling channels are shaped and spaced to correspond directly with the separate spaced rings and ribs of the metal webbing.

14. The composite mower deck of claim 7 further comprising a smooth inner skin positioned under an outer shell, wherein the smooth inner skin includes the smooth downwardly facing surface encircling a rotating cutting blade area.

15. The composite mower deck of claim 7 wherein the outer ring, the middle ring, and the inner ring are separate and spaced from each other and joined to each other by the plurality of spaced ribs extending transverse to the rings, and wherein the rings and ribs are received in the plurality of radial and circumferential recesses having a corresponding shape and spacing.

* * * * *